US010477839B2

(12) United States Patent
Gonterman

(10) Patent No.: US 10,477,839 B2
(45) Date of Patent: Nov. 19, 2019

(54) DOG LEASH ASSEMBLY

(71) Applicant: Paula Gonterman, San Rafael, CA (US)

(72) Inventor: Paula Gonterman, San Rafael, CA (US)

( * ) Notice: Subject to any disclaimer, the term of this patent is extended or adjusted under 35 U.S.C. 154(b) by 475 days.

(21) Appl. No.: 15/341,170

(22) Filed: Nov. 2, 2016

(65) Prior Publication Data
US 2018/0116179 A1    May 3, 2018

(51) Int. Cl.
*A01K 27/00* (2006.01)
*A45F 5/02* (2006.01)

(52) U.S. Cl.
CPC .......... *A01K 27/003* (2013.01); *A01K 27/005* (2013.01); *A01K 27/006* (2013.01); *A45F 5/021* (2013.01)

(58) Field of Classification Search
CPC .......... A01K 27/00; A01K 27/001–003; A01K 27/008
USPC .......................... 119/769, 770, 792–795, 797
See application file for complete search history.

(56) References Cited

U.S. PATENT DOCUMENTS

| | | | | |
|---|---|---|---|---|
| 4,763,609 A * | 8/1988 | Kulik | ................... | A01K 27/003 119/797 |
| 5,038,719 A | 8/1991 | McDonough | | |
| 5,233,942 A * | 8/1993 | Cooper | ................ | A01K 27/008 119/792 |
| D350,628 S | 9/1994 | Williams | | |
| 5,351,654 A * | 10/1994 | Fuentes | ................... | A01K 27/00 119/770 |
| 5,551,379 A * | 9/1996 | Hart | ...................... | A01K 27/003 119/771 |
| 5,664,839 A * | 9/1997 | Pedronno | ........... | B60N 2/01516 297/378.13 |
| 5,718,192 A * | 2/1998 | Sebastian | ............. | A01K 27/006 119/795 |
| 5,842,444 A * | 12/1998 | Perrulli | .................. | A01K 27/00 119/770 |
| 5,950,569 A | 9/1999 | Perrulli | | |
| 6,019,067 A * | 2/2000 | Carey | .................. | A01K 27/006 119/795 |
| 6,439,168 B1 * | 8/2002 | Maglich | ............... | A01K 27/003 119/792 |
| 6,450,129 B1 * | 9/2002 | Flynn | ..................... | A01K 27/00 119/770 |
| 6,662,753 B1 * | 12/2003 | Sporn | .................. | A01K 27/003 119/797 |
| 6,851,393 B2 * | 2/2005 | Bremm | ................ | A01K 27/003 119/770 |
| 6,932,027 B1 | 8/2005 | Whitney | | |
| 6,990,928 B2 * | 1/2006 | Kurtgis | ................... | B64D 1/12 119/770 |
| 7,467,604 B1 | 12/2008 | Werner et al. | | |
| 7,581,416 B1 * | 9/2009 | Lenertz | .................. | E05B 75/00 119/770 |

(Continued)

FOREIGN PATENT DOCUMENTS

EP          0322015          6/1988

*Primary Examiner* — Richard T Price, Jr.

(57) ABSTRACT

A dog leash assembly for facilitating hands-free restraint of a dog includes a belt that may be worn around a waist. A pouch is removably coupled to the belt. Thus, the pouch may be positioned on the waist. A leash unit is removably coupled to the belt. The leash unit may be coupled to a dog collar thereby facilitating hands-free restraint of a dog.

11 Claims, 4 Drawing Sheets

(56) References Cited

U.S. PATENT DOCUMENTS

| | | | | |
|---|---|---|---|---|
| 7,938,086 B2* | 5/2011 | Cobb | ................... | A01K 27/003 |
| | | | | 119/770 |
| 8,205,579 B2* | 6/2012 | Pellei | ................... | A47D 13/086 |
| | | | | 119/770 |
| 8,342,137 B1* | 1/2013 | Burkhardt | ............ | A01K 27/004 |
| | | | | 119/770 |
| 8,967,086 B2* | 3/2015 | Palladino | ............... | A01K 27/00 |
| | | | | 119/793 |
| 2004/0112303 A1 | 6/2004 | Moulton, III | | |

* cited by examiner

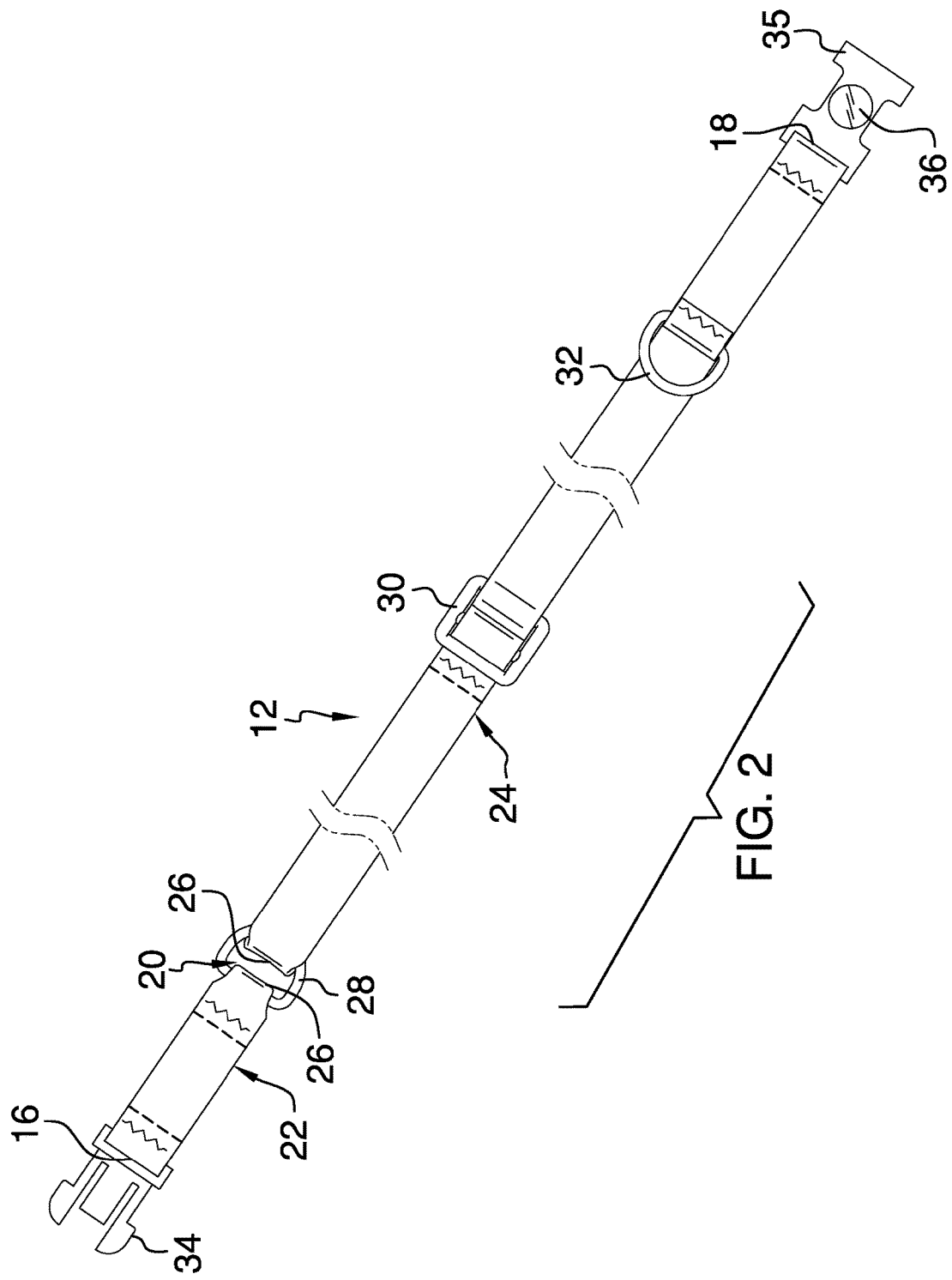

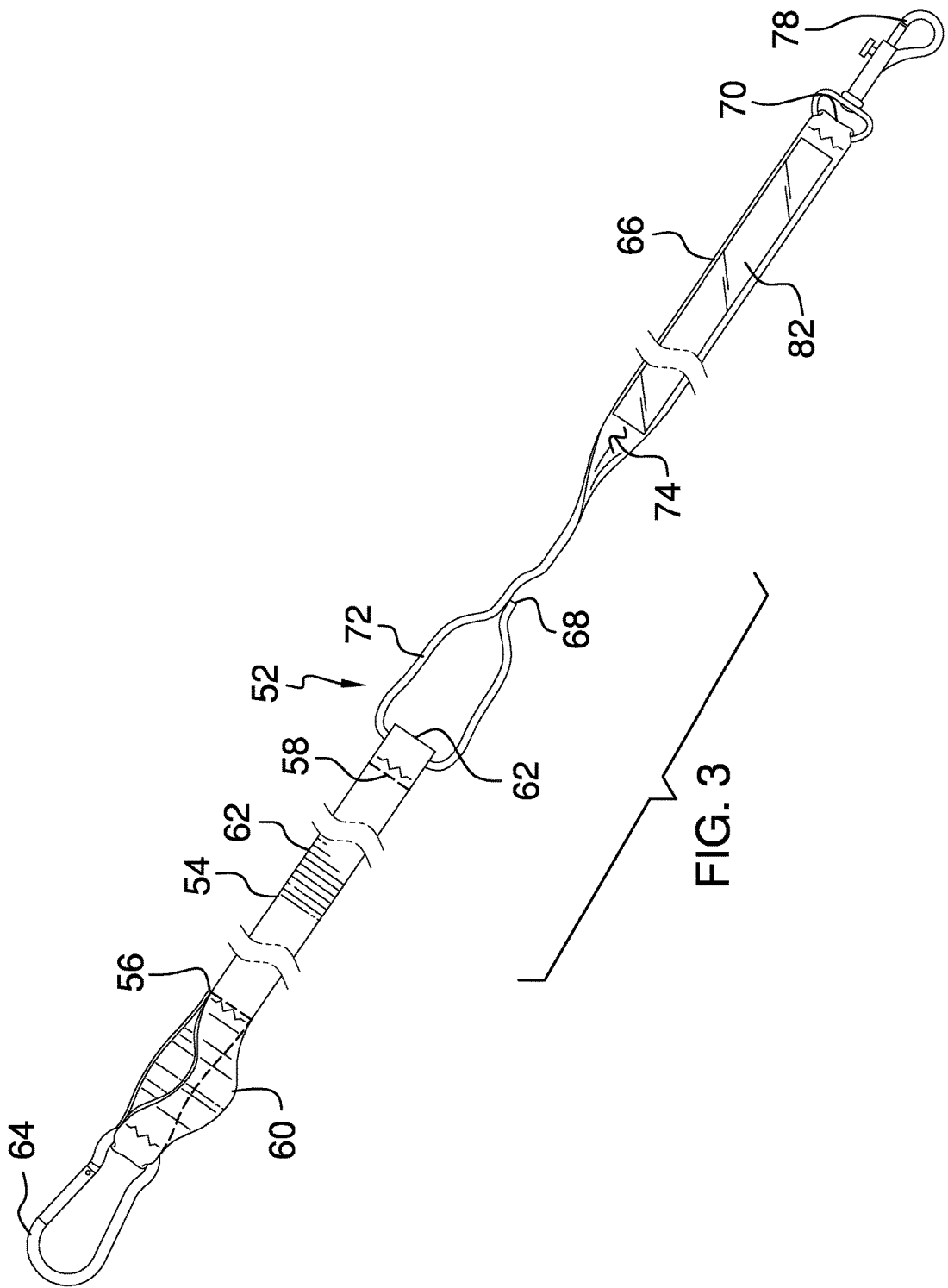

DOG LEASH ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to leash devices and more particularly pertains to a new leash device for facilitating hands-free restraint of a dog.

BRIEF SUMMARY OF THE INVENTION

An embodiment of the disclosure meets the needs presented above by generally comprising a belt that may be worn around a waist. A pouch is removably coupled to the belt. Thus, the pouch may be positioned on the waist. A leash unit is removably coupled to the belt. The leash unit may be coupled to a dog collar thereby facilitating hands-free restraint of a dog.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a front view of belt of an embodiment of the disclosure.

FIG. 3 is a front view of leash unit of an embodiment of the disclosure.

DETAILED DESCRIPTION OF THE INVENTION

Figure 1:
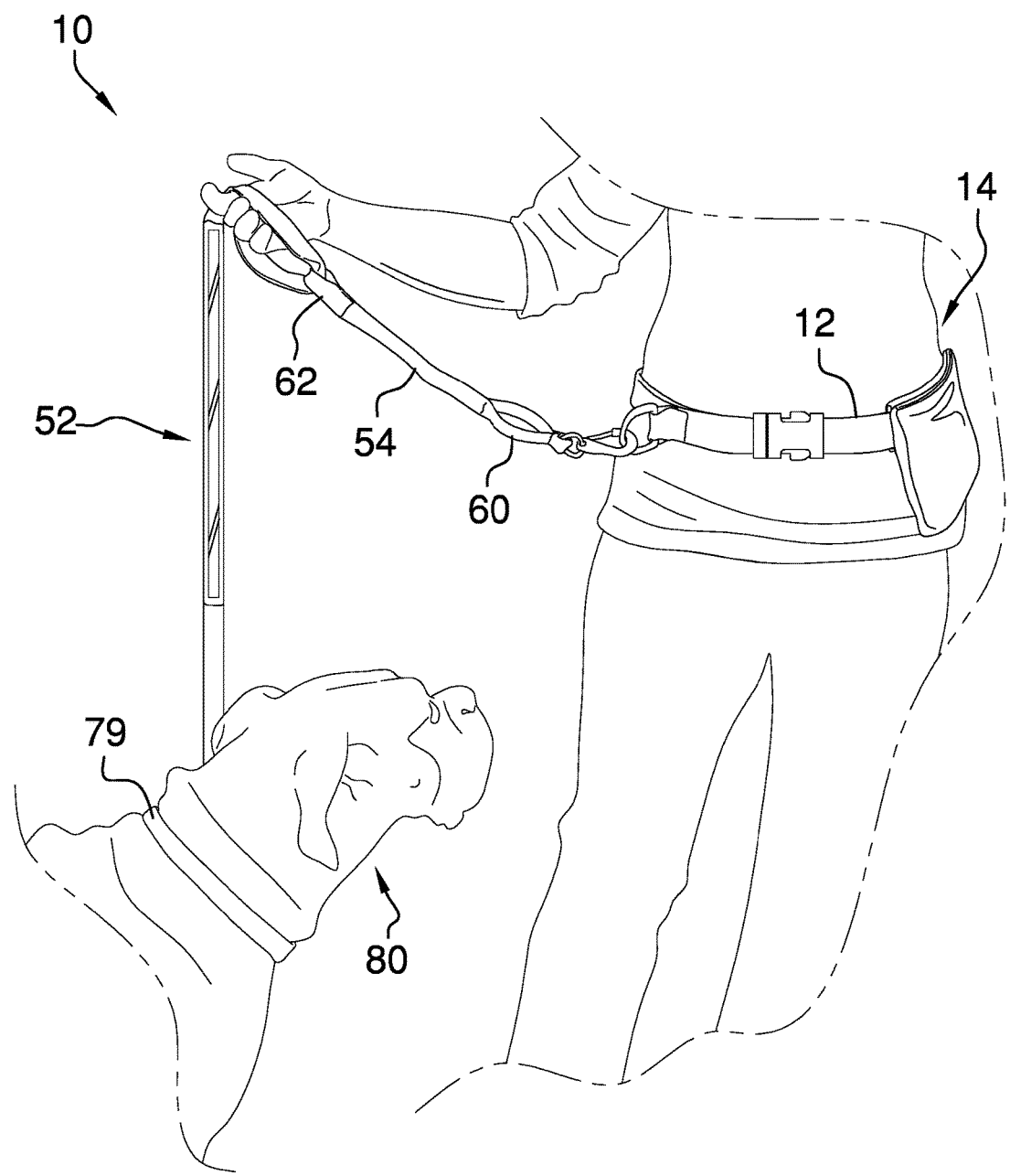
FIG. 1 is a perspective in-use view of a dog leash assembly according to an embodiment of the disclosure.
Figure 5:
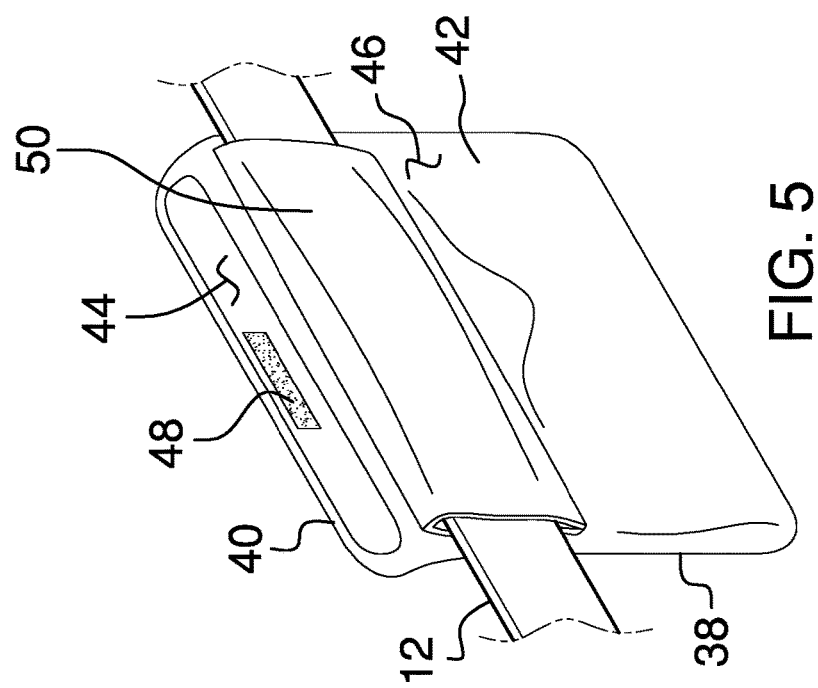
FIG. 5 is a back perspective view of pouch of an embodiment of the disclosure.
Figure 4:
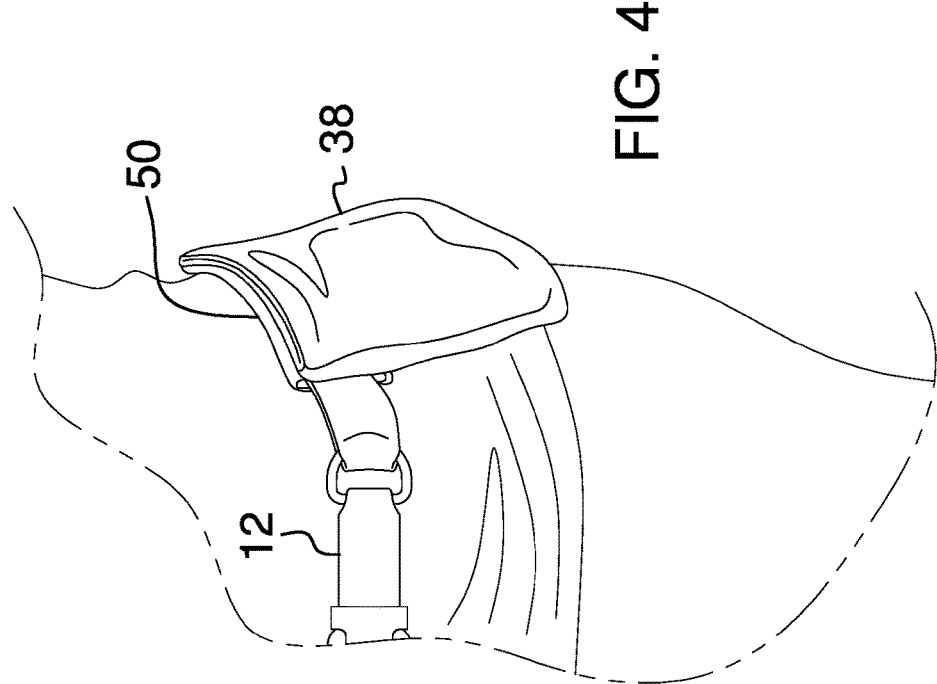
FIG. 4 is a perspective view of a pouch of an embodiment of the disclosure.

With reference now to the drawings, and in particular to FIGS. 1 through 5 thereof, a new leash device embodying the principles and concepts of an embodiment of the disclosure and generally designated by the reference numeral 10 will be described.

As best illustrated in FIGS. 1 through 5, the dog leash assembly 10 generally comprises a belt 12 that may be worn around a waist 14. The belt 12 has a first end 16 and a second end 18. The belt 12 has a cut 20 to define a first portion 22 of the belt 12 and a second portion 24 of the belt 12. Each of the first portion 22 and the second portion 24 has a terminal end 26. A first ring 28 is sewn into the terminal end 26 corresponding to each of the first portion 22 and the second portion 24. Thus, the first portion 22 is coupled to the second portion 24.

A buckle 30 is slidably positioned on the second portion 24 of the belt 12. The buckle 30 may be manipulated. The second portion 24 of the belt 12 is looped through the buckle 30. Thus, the buckle 30 facilitates adjusting a length of the second portion 24.

A second ring 32 is movably sewn into the second portion 24 of the belt 12. A first fastener 34 is coupled to the first end 16 of the belt 12. A second fastener 35 is coupled to the second end 18 of the belt 12. The first fastener 34 is complementary with respect to the second fastener 35. Thus, each of the first fastener 34 and the second fastener 35 retains the belt 12 around the waist 14. Each of the first fastener 34 and the second fastener 35 may comprise a clip or the like.

A decal 36 is coupled to the second fastener 35. The decal 36 is comprised of a reflective material. Thus, the decal 36 reflects light. The decal 36 enhances visibility of the second fastener 35 in a darkened environment.

A pouch 38 is provided. The pouch 38 is removably coupled to the belt 12 to be positioned on the waist 14. The pouch 38 may contain dog 80 food, bags or other items. The pouch 38 has a top side 40 and a back side 42. The top side 40 is open to access an interior of the pouch 38. The pouch 38 has an inner surface 44 and an outer surface 46.

A hook and loop fastener 48 is coupled to the inner surface 44 of the pouch 38. The hook and loop fastener 48 is aligned with the top side 40 to selectively close the top side 40. A sleeve 50 is coupled to the pouch 38. The sleeve 50 is horizontally oriented on the outer surface 46 corresponding to the back side 42. The belt 12 is selectively extended through the sleeve 50 such that the pouch 38 is positioned on the belt 12.

A leash unit 52 provided. The leash unit 52 is removably coupled to the belt 12. The leash unit 52 may be coupled to a dog 80. Thus, the leash unit 52 facilitates hands-free restraint of the dog 80.

The leash unit 52 comprises a first strap 54 that has a primary end 56 and a secondary end 58. The primary end 56 is sewn to the first strap 54 to define a first loop 60. The secondary end 58 is sewn to the first strap 54 to define a second loop 62. The first strap 54 is comprised of a resiliently stretchable material.

A first clasp 64 is movably coupled to the first loop 60. The first clasp 64 may be manipulated. The first clasp 64 removably engages the second ring 32 on the belt 12 such the first strap 54 is attached to the belt 12. The first clasp 64 may comprise a carabiner or the like.

A second strap 66 is provided. The second strap 66 has a principal end 68 and an alternative end 70. The principal end 68 is sewn to the second strap 66 to define a third loop 72. The third loop 72 extends through the second loop 62. Thus, the second strap 66 is coupled to the first strap 54. The second strap 66 has a first surface 74.

A second clasp 78 is provided. The second clasp 78 coupled to the alternative end 70 and the second clasp 78 may be removably coupled to a collar 79 on the dog 80. Thus, the leash unit 52 is attached to the dog 80. The second clasp 78 may be a lobster claw clasp or the like.

A reflective strip 82 is provided. The reflective strip 82 is coupled to the first surface 74 of the second strap 66. The reflective strip 82 is comprised of a reflective material. Thus, the reflective strip 82 reflects light. The reflective strip 82 enhances visibility of the second strap 66 in a darkened environment. A plurality of leash units 52 may be provided and each of the plurality of leash units 52 may be coupled to a selected one of the first ring 28 and the second ring 32. Thus, an individual may walk a plurality of dogs 80.

In use, the belt 12 is extended through the sleeve 50 on the pouch 38. The belt 12 is worn around the waist 14 and the first fastener 34 is manipulated to engage the second fastener 35. The first clasp 64 is manipulated to engage the second ring 32 on the belt 12. Thus, the leash unit 52 is coupled to the belt 12. The second clasp 78 is manipulated to engage the collar 79 on the dog 80.

A selected one of the third loop 72 and the first loop 60 is gripped. Thus, the dog 80 is restrained for walking or the like. The leash unit 52 is alternatively left to hang freely from the belt 12. Thus, the dog 80 is restrained by the waist 14 of a user. The leash unit 52 facilitates hands-free restraint of the dog 80 for a physically impaired user or the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A dog leash assembly being configured to be worn around a waist thereby facilitating hands-free restraint of a dog, said assembly comprising:

a belt being configured to be worn around a waist, said belt having a first end and a second end, said belt having a cut to define a first portion of said belt and a second portion of said belt, each of said first portion and said second portion having a terminal end;

a first fastener being coupled to said first end of said belt; and a second fastener being coupled to said second end of said belt, said first fastener being complementary with respect to said second fastener wherein each of said first fastener and said second fastener is configured to retain said belt around the waist;

a decal being coupled to said second fastener, said decal being comprised of a reflective material wherein said decal is configured to reflect light thereby enhancing visibility of said second fastener in a darkened environment;

a pouch being removably coupled to said belt wherein said pouch is configured to be positioned on the waist; and a leash unit being removably coupled to said belt, said leash unit being configured to be coupled to a dog thereby facilitating hands-free restraint of the dog.

2. The assembly according to claim 1, further comprising a first ring being sewn into said terminal end corresponding to each of said first portion and said second portion such that said first portion is coupled to said second portion.

3. The assembly according to claim 1, further comprising a second ring being movably sewn into said second portion of said belt.

4. The assembly according to claim 1, wherein said pouch has a top side and a back side, said top side being open to access an interior of said pouch, said pouch having an inner surface and an outer surface.

5. The assembly according to claim 4, further comprising a sleeve being coupled to said pouch, said sleeve being horizontally oriented on said outer surface corresponding to said back side, said belt being selectively extended through said sleeve such that said pouch is positioned on said belt.

6. The assembly according to claim 1, wherein said leash unit comprises a first strap having a primary end and a secondary end, said primary end being sewn to said first strap to define a first loop, said secondary end being sewn to said first strap to define a second loop, said first strap being comprised of a resiliently stretchable material.

7. The assembly according to claim 6, further comprising a first clasp being movably coupled to said first loop, said first clasp being configured to be manipulated, said first clasp removably engaging said second ring on said belt such said first strap is attached to said belt.

8. The assembly according to claim 6, further comprising a second strap having a principal end and an alternative end, said principle end being sewn to said second strap to define a third loop, said third loop extending through said second loop such that said second strap is coupled to said first strap, said second strap having a first surface.

9. The assembly according to claim 8, further comprising a second clasp being coupled to said alternative end wherein said second clasp is configured to be removably coupled to a collar on the dog.

10. The assembly according to claim 8, further comprising a reflective strip being coupled to said first surface of said second strap, said reflective strip being comprised of a reflective material wherein said reflective strip is configured to reflect light thereby enhancing visibility of said second strap in a darkened environment.

11. A dog leash assembly being configured to be worn around a waist thereby facilitating hands-free restraint of a dog, said assembly comprising:
 a belt being configured to be worn around a waist, said belt having a first end and a second end, said belt having a cut to define a first portion of said belt and a second portion of said belt, each of said first portion and said second portion having a terminal end;
 a first ring being sewn into said terminal end corresponding to each of said first portion and said second portion such that said first portion is coupled to said second portion;
 a second ring being movably sewn into said second portion of said belt;
 a first fastener being coupled to said first end of said belt;
 a second fastener being coupled to said second end of said belt, said first fastener being complementary with respect to said second fastener wherein each of said first fastener and said second fastener is configured to retain said belt around the waist;
 a decal being coupled to said second fastener, said decal being comprised of a reflective material wherein said decal is configured to reflect light thereby enhancing visibility of said second fastener in a darkened environment;
 a pouch being removably coupled to said belt wherein said pouch is configured to be positioned on the waist, said pouch having a top side and a back side, said top side being open to access an interior of said pouch, said pouch having an inner surface and an outer surface;
 a sleeve being coupled to said pouch, said sleeve being horizontally oriented on said outer surface corresponding to said back side, said belt being selectively extended through said sleeve such that said pouch is positioned on said belt; and
 a leash unit being removably coupled to said belt, said leash unit being configured to be coupled to a dog thereby facilitating hands-free restraint of the dog, said leash unit comprising:
  a first strap having a primary end and a secondary end, said primary end being sewn to said first strap to define a first loop, said secondary end being sewn to said first strap to define a second loop, said first strap being comprised of a resiliently stretchable material,
  a first clasp being movably coupled to said first loop, said first clasp being configured to be manipulated, said first clasp removably engaging said second ring on said belt such said first strap is attached to said belt,
  a second strap having a principal end and an alternative end, said principle end being sewn to said second strap to define a third loop, said third loop extending through said second loop such that said second strap is coupled to said first strap, said second strap having a first surface,
  a second clasp being coupled to said alternative end wherein said second clasp is configured to be removably coupled to a collar on the dog, and
  a reflective strip being coupled to said first surface of said second strap, said reflective strip being comprised of a reflective material wherein said reflective strip is configured to reflect light thereby enhancing visibility of said second strap in a darkened environment.

\* \* \* \* \*